Patented Jan. 5, 1937

2,067,002

UNITED STATES PATENT OFFICE 2,067,002

PROCESS FOR THE MANUFACTURE OF CONCENTRATED PRODUCTS

Alfred Pollak, Woodmere, N. Y.

No Drawing. Application February 21, 1935,
Serial No. 7,637

6 Claims. (Cl. 99—5)

My invention relates to an improved process for manufacturing concentrated products from various kinds of extracts and wastes.

Considerable difficulty has heretofore been encountered in concentrating, by evaporation, liquids which contain a preponderating amount of organic substances, as for example extracts of vegetable origin or liquid wastes derived from sundry industrial processes. When the liquids to be evaporated contain soluble carbohydrates, proteins, amino acids, organic acids, salts and acid salts, intense caramelization occurs in the evaporator as soon as the non-volatile acids and acid salts attain a substantial degree of concentration. Caramelization results in darkening the color of the product and the formation of empyreumatic substances, whereby the value and range of application of the concentrates are adversely affected.

Substantial concentration of the acid constituents of solutions containing soluble proteins are detrimental to the solution, in that irreversible precipitation as one phase and splitting of certain genuine proteins as another phase may occur. Neither phenomenon is desirable, if the finished product is to be used, for example, in the fermentation industries, in baking or in yeast manufacture.

If it be desired to concentrate extracts containing enzymes which are to be preserved, the acidity during evaporation must be maintained at a low value as otherwise the enzymes either will not survive at all or, at best, will be considerably weakened. If the liquid contains organic compounds with phosphoric acid, they will be split as soon as the acidity of the medium in the evaporator rises.

My invention is applicable to the treatment of a great variety of substances, among which may be mentioned, as illustrative:—the liquid spent washes of the mashes of grain, potatoes, beets, cane, syrup and molasses; the steepwater derived from the manufacture of cornstarch and the presswater and waste water of other starch manufacture. The types of materials just mentioned contain valuable compounds and the products produced by the application of my invention are advantageously usable in the fermentation industries as well as in baking, for which purpose neutral taste and light color in the product are of outstanding importance.

Another type of materials to which my invention applies comprises extracts of grains generally, of malt, of bran, of sprouts and of similar raw materials. Extracts made from vegetables which are to be extracted with acidulated water, extracts or wastes resulting from processing seeds rich in proteins or fats, such as soya beans and the like, are all substances to which my invention is applicable.

The principal object of my invention is to overcome the difficulty inhering in present methods of concentrating substances of the character enumerated, and I accomplish this object by effecting neutralization of the material at a point before the acidity reaches a stage which will have a deleterious effect on the desired final product. Neutralization, in accordance with my invention, is effected by suitable alkalies, the particular alkali used in any given case depending on the qualities which it is desired to impart to the concentrate or the use to which it is to be put.

If, for example, evaporation is to be effected of steepwater from cornstarch production, and the concentrate is intended for use as a nutrient for yeast in the fermentation industries or as a bread conditioner in baking, the desirable neutralizing agents are ammonia, ammonium carbonates, carbamide, urea, lime, calcium, carbonates, the corresponding magnesium compounds or mixtures of both types of compounds. The selection of the neutralizing agent will depend on the original composition of the raw material and the intended use of the concentrate. By this procedure, I not only obtain a better product than heretofore but one which contains a greater quantity of elements which are important for the nutrition of yeast.

In treating malt infusions or extracts of vegetable materials to be used for foodstuffs, as such, the preferred neutralizing media are alkaline sodium or potassium compounds, alternatingly, in admixture with earth alkalies. This method of treatment assures satisfactory taste of the product.

I prefer to effect continuous neutralization of the solution during evaporation, because in numerous cases, particularly those in which phytin-containing materials are treated, there is a constant growth of acidity due to the continuous liberation of phosphoric acid or the acid salts thereof.

Upon completion of concentration the concentrate may be restored to the state of acidity appropriate to the particular case, such restoration being effected by the addition to the concentrate of acid, acid salts or non-neutralized raw material of the same kind as the starting material. As a result of the restoration of acidity, in most cases the color of the material becomes lighter and its taste is improved, two factors of particular importance in foods for humans and animals.

The following specific examples will further serve to illustrate, without intending to limit, the application of my invention.

Example 1

Liquid spent wash from a grain mash is to be evaporated to a concentration of about 50° Balling. The original extract in the wash will be assumed to be 3.0° Balling and the acidity to correspond to 2.5 c. c. N.NaOH per 100 gr. The wash is to be evaporated to about 1/17th of its original volume and the acidity in the finished product would therefore be about 43 c. c. normal solution. This acid solution would be much too high and would react unfavorably on color, taste and stability of the extract components. According to my invention, the thin wash is first neutralized to an acidity of about 0.1 c. c. normal solution by the addition of the kind of alkali consistent with the ultimate use of the concentrate. If the concentrate is intended for fermentation, yeast production or baking, the alkali to be used will be ammonia, ammonium compounds, carbamide or urea. If the concentrate is to be used for human or animal food purposes, lime or chalk will be used as the neutralizer. The final product will have an acidity of about 1.7 c. c. normal solution, which will be suitable for the several purposes.

*Example 2*

In evaporating steepwater derived from the manufacture of corn starch the conditions will be somewhat different than those in Example 1. Assume the original extract to be 8° Balling, the acidity to correspond to 3 c. c. normal solution per 100 gr. and that it is desired that the final product be 55° Balling. Hence, the evaporation would be 1/7th of the original volume and the finished product would have an acidity of about 21 c. c. N.NaOH per 100 gr. In this case the preliminary neutralization of the thin liquid should not be carried too far because of the precipitation of the acid phosphates as soon as the neutral point is reached. Therefore, the neutralization at the start of the operation will be held at about 2 c. c. normal solution and the acidity in the evaporator will be controlled continuously by the introduction of appropriate quantities of alkalies suited to the purpose. In this manner, an acidity of 1.5 to 2.5 c. c. will be maintained constantly in the medium.

As phytins may dissociate to a certain degree during the evaporation and to liberate acid reacting substances, it is evident that more alkali must be used to keep down the acidity during the concentration process than would correspond to the amount of acid present at the start of the operation.

*Example 3*

In the case of raw materials high in content of phytin, or phosphates or other less soluble compounds it is indicated, to avoid a heavy or crystalline precipitate, to enhance the content of the product in colloids, by adding for example .5 to 5% (figured on dry substance) of colloids such as starchpaste, dextrin, syrup, gums, pectin, or others adapted to the individual case. They will be added to the thin liquid, or in the evaporator as soon as concentration starts to rise, and before a substantial precipitation occurs. Examples of such raw materials are steepwater, whey and similar products.

If the final product is to be used for example in the baking industry, instead of the colloid the same amount of a suitable fat or oil may be added, which fatty substance is first dispersed and emulsified, after applying an efficient, edible emulsifier to it. The oil-soluble emulsifier is first dissolved in the fat, then the fat is further dispersed in a small part of the liquid material, and the resulting emulsion added to the whole batch in the evaporator.

I have not deemed it necessary to show or describe apparatus in which my invention may be carried out as any standard type of apparatus may be used. In many cases a vacuum evaporator will serve best, and the product will be used up in a semi-liquid state. In other cases the product has to be completely dehydrated, and a spray drier will be used for the thin material instead of a vacuum pan. The methods described above will be the same in principle, except that there will not be a continuous neutralization in the evaporator, because unnecessary. The amount of alkalies, as figured necessary for a final product with predetermined acidity, will all be added to the thin liquid before spraying.

I claim:

1. The method of concentrating, by evaporation, liquids containing a preponderating amount of organic substances including soluble carbohydrates, proteins, amino acids, organic acids, salts and acid salts, which method consists in adding an alkaline substance to the liquids to neutralize the acidity thereof, and thereafter heating and evaporating the liquids to obtain the desired concentration, whereby, due to the neutralization before and during evaporation, the destructive influence of the acids upon the said organic substances such as caramelization and deterioration of proteinic matter is prevented.

2. In the method of concentrating, by evaporation, liquid wastes and vegetable extracts which contain acids and acid compounds at a higher ratio with respect to the dry substance than the raw materials from which said wastes originated, that improvement which comprises the step of adding to the said wastes an alkaline material in order to neutralize the acidity thereof, and the further step of heating and evaporating said wastes to the desired concentration, said neutralization being carried out prior to the formation of the final concentrate, whereby the deleterious influence of the acids upon the unstable organic compounds during evaporation and desiccation is prevented.

3. The method claimed in claim 2, in which nitrogen-containing alkalies are added to the wastes both before and during the evaporation.

4. The method of concentrating, by evaporation, liquids such as distillers' spent wash, steep water and press water of starch factories, and acid containing vegetable extracts, for use in fermentation, which method comprises the steps of adding alkaline compounds of earth alkalies to the said waste liquids, heating and evaporating the latter, said neutralizing step being carried out both before and during evaporation in order to prevent the deleterious influence of the acids upon the unstable organic compounds such as caramelization and the deterioration of proteinic matter.

5. The method claimed in claim 4, in which nitrogen-containing alkalies are used for neutralization in conjunction with the said earth alkalies.

6. The method claimed in claim 2, in which a colloidal substance is added to prevent heavy and crystalline precipitation due to the neutralization.

ALFRED POLLAK.